United States Patent
Yang et al.

(10) Patent No.: US 11,043,907 B2
(45) Date of Patent: Jun. 22, 2021

(54) ULTRASONIC LINEAR ACTUATION DEVICE UTILIZING STANDING WAVE OSCILLATIONS FOR ACTUATION

(71) Applicant: Industrial Technology Research Institute, Hsin-Chu (TW)

(72) Inventors: Han-Ping Yang, Hsinchu (TW); Cheng-Ping Yang, Taoyuan (TW); Kun-Ju Xie, Changhua County (TW); Shou-Cheng Ma, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 360 days.

(21) Appl. No.: 16/231,651

(22) Filed: Dec. 24, 2018

(65) Prior Publication Data

US 2020/0169189 A1   May 28, 2020

(30) Foreign Application Priority Data

Nov. 27, 2018 (TW) ................................ 107142274

(51) Int. Cl.
*H02N 2/02* (2006.01)
(52) U.S. Cl.
CPC .................................. *H02N 2/025* (2013.01)
(58) Field of Classification Search
CPC ............................. H02N 2/025; H02N 2/021
See application file for complete search history.

(56) References Cited

U.S. PATENT DOCUMENTS

| 5,079,470 | A | 1/1992 | Kasuga et al. |
| 6,243,218 | B1 * | 6/2001 | Whitehead ............. B60R 1/072 359/841 |
| 6,940,209 | B2 | 9/2005 | Henderson |
| 7,307,372 | B2 | 12/2007 | Uchino et al. |
| 7,365,463 | B2 | 4/2008 | Horst et al. |
| 7,598,656 | B2 * | 10/2009 | Wischnewskij .... H01L 41/0986 310/323.01 |

(Continued)

FOREIGN PATENT DOCUMENTS

| CN | 103856101 B | 1/2017 |
| CN | 104506081 B | 2/2017 |

(Continued)

OTHER PUBLICATIONS

TW OA dated Apr. 30, 2019.

(Continued)

*Primary Examiner* — Emily P Pham
(74) *Attorney, Agent, or Firm* — WPAT, PC

(57) ABSTRACT

An ultrasonic linear actuation device includes a mover and a plurality of stator sets. The mover includes at least one mover rack. The plurality of stator sets is located in correspondence with the mover. Each of the plurality of stator sets includes an actuating component and a plurality of stator racks. The actuating component is used for stimulating corresponding one of the plurality of stator sets to generate standing-wave oscillations in an oscillation direction, such that the plurality of stator racks of each of the plurality of stator sets can engage the at least one mover rack of the mover to allow the stator racks to mesh the corresponding mover rack and thus to displace the mover in a moving direction.

21 Claims, 12 Drawing Sheets

(56) References Cited

U.S. PATENT DOCUMENTS

| | | | |
|---|---|---|---|
| 7,786,650 B2 | 8/2010 | Takasan et al. | |
| 2004/0113519 A1* | 6/2004 | Mentesana | H02N 2/0065 |
| | | | 310/323.09 |
| 2005/0253484 A1 | 11/2005 | Kishi et al. | |
| 2008/0164783 A1 | 7/2008 | Okada | |
| 2008/0185932 A1* | 8/2008 | Jajtic | H02K 1/17 |
| | | | 310/181 |
| 2008/0247059 A1 | 10/2008 | Dong | |
| 2009/0009029 A1 | 1/2009 | Sakamoto | |
| 2011/0050035 A1 | 3/2011 | Wischnewskiy et al. | |
| 2012/0193172 A1 | 8/2012 | Matscheko et al. | |
| 2013/0049488 A1* | 2/2013 | Making | H02K 41/033 |
| | | | 310/12.18 |
| 2014/0175946 A1 | 6/2014 | Wischnewskiy | |
| 2015/0114164 A1 | 4/2015 | Urano | |
| 2015/0222165 A1 | 8/2015 | Filippa | |
| 2015/0318801 A1 | 11/2015 | Kamijo et al. | |
| 2016/0268883 A1* | 9/2016 | Kakihara | H02K 41/033 |
| 2017/0207725 A1 | 7/2017 | Kojima | |
| 2017/0214339 A1 | 7/2017 | Wischnewskiy et al. | |

FOREIGN PATENT DOCUMENTS

| | | |
|---|---|---|
| TW | I327813 B | 7/2010 |
| TW | 201329348 A | 7/2013 |
| TW | I555323 | 10/2016 |
| WO | WO2006074442 A2 | 7/2006 |

OTHER PUBLICATIONS

Kwon Joong Son et al., "An Ultrasonic Standing-wave-actuated Nano-positioning Walking Robot Piezoelectric-metal Composite Beam Modeling", Received Dec. 2, 2005; accepted Apr. 25, 2006, pp. 1293-1309,Sage Publications.

Kohei Matsuzawa et al., "Driving method of multiple ultrasonic motors using common line signal input", Accepted May 7, 2010; Available online May 16, 2010, pp. 210-216, Elsevier B.V.

El, Ghouti N., "Hybrid Modelling of a Traveling Wave Piezoelectric Motor", 2000, Aalborg Universitetsforlag, Norddin El Ghouti.

Hassan Hussein Hariri et al., "Locomotion Study of a Standing Wave Driven Piezoelectric Miniature Robot for Bi-Directional Motion", 2017, IEEE Transactions on Robotics.

Takaaki Ishii et al., "A Low-Wear Driving Method of Ultrasonic Motors", May 1999, pp. 3338-3341, Jpn. J. Appl. Phys. vol. 38, Publication Board, Japanese Journal of Applied Physics.

Hyeoung woo Kim et al., "Novel method for driving the ultrasonic motor", Oct. 2002, pp. 1356-1362, vol. 49, No. 10, IEEE transactions on ultrasonics, ferroelectrics, and frequency control.

* cited by examiner

ULTRASONIC LINEAR ACTUATION DEVICE UTILIZING STANDING WAVE OSCILLATIONS FOR ACTUATION

CROSS REFERENCE TO RELATED APPLICATION

This application claims the benefits of Taiwan application Serial No. 107142274, filed on Nov. 27, 2018, the disclosures of which are incorporated by references herein in its entirety.

TECHNICAL FIELD

The present disclosure relates in general to an ultrasonic linear actuation device.

BACKGROUND

Upon when an electric field (voltage) is applied onto a piezoelectric material, a corresponding electric dipole moment at an electric dipole in the piezoelectric material would become larger. To respond a corresponding increase in the distance of the electric dipole, the piezoelectric material would be elongated accordingly along the electric field. In the art, such a process of producing a mechanical deformation via applying the electric field is called as the converse piezoelectric effect. It is obviously that the converse piezoelectric effect is substantially a transformation process from an electric energy into a mechanical energy. In one of conventional applications, a piezoelectric motor that fulfills the converse piezoelectric effect utilizes a piezoelectric component to stimulate an ultrasonic vibration with micro fluctuations and higher frequencies. In addition, in some specific spots or areas on stators of the piezoelectric motor, particle motions following specific tracks would be found. Through friction coupling between stators and corresponding movers of the piezoelectric motor, output of mechanical energy by this new type of motor can be fulfilled.

In particular, the piezoelectric motors can be grouped into semi-static motors or ultrasonic motors. These two types of piezoelectric motors are both driven by the piezoelectric components, but the difference is that movers of the semi-static motor are not driven by vibrations, unlike those of the ultrasonic motor. For example, a pair of piezoelectric films are provided to each of two opposing sides of a friction block, and then different voltages are applied to respective pairs of the piezoelectric films to induce corresponding deformations. Thereupon, the piezoelectric films can oscillate and deform at respective sides of the friction block, and thereby the induced friction forces on surfaces of the friction block would displace the friction block. In the art, the conventional piezoelectric motor is featured in structural compactness, low speed but large torque, quick response, self-locking upon shutdown, and electromagnetic interference proof. The piezoelectric motor as a new-type driving device is widely applied to various fields, even now to the fields of industrial robots, scanning electron microscopes, and precision machineries.

Nevertheless, in view that the application of the piezoelectric motor in the fields of industrial robots, scanning electron microscopes, and precision machineries becomes wider and wildly gradually, the topic how to maintain high output in the situation of the piezoelectric motor being reduced in size to pair the corresponding mechanical element is urgent to be resolved in the art.

SUMMARY

In this disclosure, an ultrasonic linear actuation device is provided by utilizing standing-wave oscillations of actuators and engagements of gear racks to maintain the advantage of the ultrasonic linear actuation device in smaller size and higher output. In addition, through stimulating orderly a series of stators to mesh corresponding racks, movers of the ultrasonic linear actuation device can be moved purposely.

According to this disclosure, an embodiment of the ultrasonic linear actuation device includes a mover and a plurality of stator sets. The mover includes at least one mover rack. The plurality of stator sets is located in correspondence with the mover. Each of the plurality of stator sets includes an actuating component and a plurality of stator racks. The actuating component is used for stimulating corresponding one of the plurality of stator sets to generate standing-wave oscillations in an oscillation direction, such that the plurality of stator racks of each of the plurality of stator sets can engage the at least one mover rack of the mover to allow the stator racks to mesh the corresponding mover rack and thus to drive the mover toward to specific moving direction.

As stated, by providing the ultrasonic linear actuation device of this disclosure, the actuating component is utilized to generate oscillation signals for further exciting standing-wave oscillations of the corresponding stator sets, such that the stator racks of each individual stator set can mesh the corresponding mover racks, and so that the movers of the ultrasonic linear actuation device can be driven to specific direction.

Further, this disclosure uses individual stator sets to generate corresponding standing-wave oscillations, and thus the related vibrational amplitudes can be increased. Thereby, the required displacement for the stator racks to mesh the mover rack can be obtained, and the entire thickness of the ultrasonic linear actuation device can be reduced.

In addition, the conventional design utilizes friction to generate forcing to drive the mover, the maximum output is limited by the magnitude of the friction, and thus wear in components would be obvious. On the other hand, this disclosure utilizes each of the stator sets to generate corresponding standing-wave oscillations. When the excited oscillations approach any of resonant frequencies, the vibration amplitude will grow rapidly, and so the required displacement for the stator rack to mesh the mover rack would be obtained. Namely, as the amplitude of the vibration of the stators is increased rapidly, the stator rack would be much easier to mesh the mover rack. Also, since the meshing of gear racks is a type of stiff contact, thus wear of related components could be reduced.

In addition, output forcing of this disclosure is mainly the supportive force provided from the engagement of the stator rack and the mover rack. In other words, the output forcing of this disclosure can be increased because the conventional friction forcing is replaced by the meshing of gear racks. Thus, the ultrasonic linear actuation device of this disclosure can provide a satisfied output force, even that the size thereof is reduced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
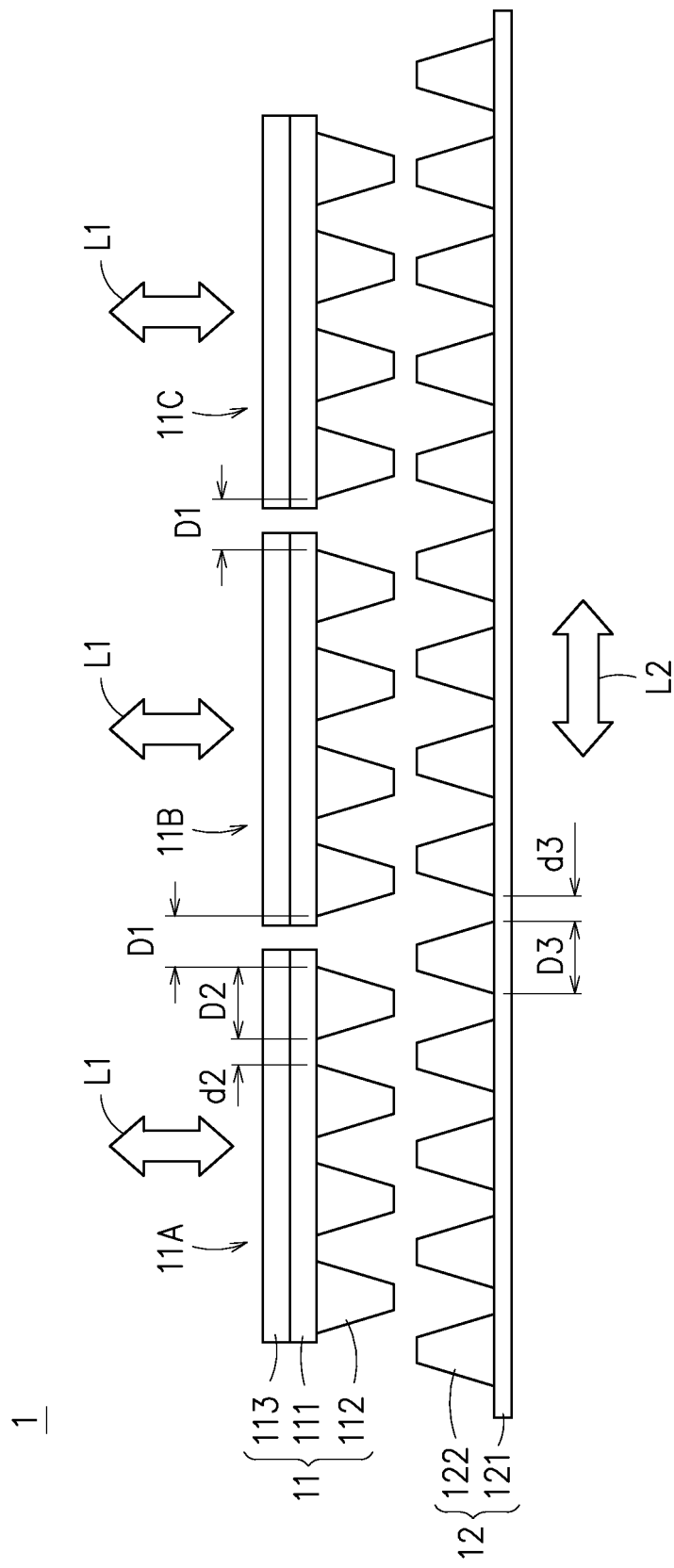
FIG. 1 is a schematic view of an embodiment of the ultrasonic linear actuation device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a schematic view of an embodiment of the ultrasonic linear actuation device in accordance with this disclosure is shown. In this embodiment, the ultrasonic linear actuation device 1 includes a plurality of stator sets 11 and a mover 12. The mover 12 includes a mover rack 121, and the mover rack 121 has thereon a plurality of mover teeth 122. It shall be explained that, though a single mover rack 121 is shown in FIG. 1, yet this disclosure does not limit the number of mover racks. In some other embodiments in accordance with this disclosure not shown here, plural mover racks 121 can be included.

Figure 2A:
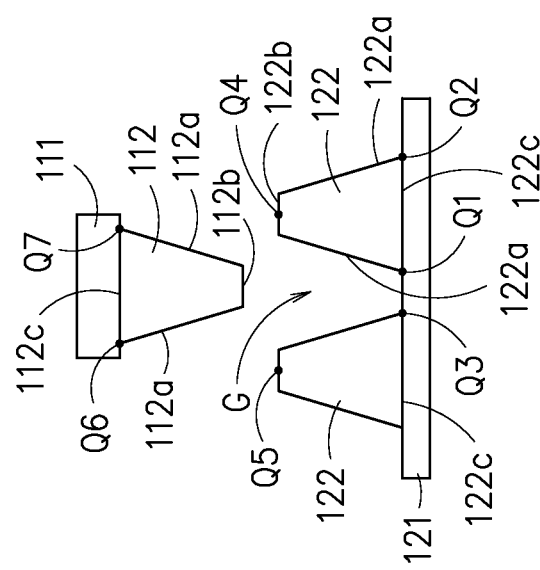
FIG. 2A is a schematic view of the tooth profile for both the stator tooth and the mover tooth of FIG. 1.
Figure 2B:
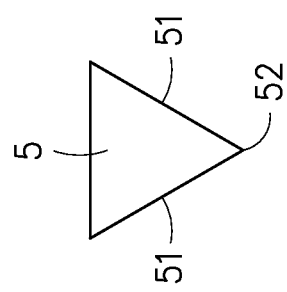
FIG. 2B is a schematic view of another embodiment of the tooth profile for the stator tooth of FIG. 1.
Figure 2C:
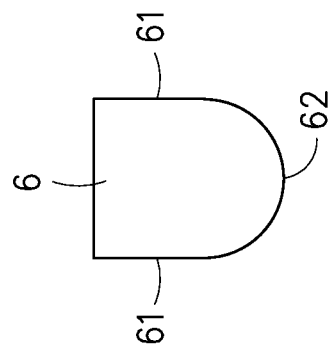
FIG. 2C is a schematic view of a further embodiment of the tooth profile for the stator tooth of FIG. 1.

In this embodiment, a plurality of mover teeth 122 is discretely arranged on the mover rack 121 in a periodical manner. Also, the tooth profile for the mover tooth 122 is a symmetric tooth profile. As shown in FIG. 2A, the tooth profile for the mover teeth 122 is an isosceles trapezoidal tooth profile, and the neighboring mover teeth 122 are spaced by a tooth gap G. Each of the mover teeth 122 includes two mover-tooth contact surfaces 122a, a mover-tooth top 122b and a mover-tooth base 122c. The two mover-tooth contact surfaces 122a, located oppositely to each other, are connected by the mover-tooth top 122b. The connection (point in the figure, but line in a 3D view not shown here) of the mover-tooth top 122b and each of the mover-tooth contact surface 122a can be seen as a deflected junction. Ends of the two mover-tooth contact surfaces 122a away from the mover-tooth top 122b are connected to the mover-tooth base 122c on the mover rack 121. In this embodiment, in a cross-sectional view, the two mover-tooth contact surfaces 122a, the mover-tooth top 122b and the mover-tooth base 122c are integrated to demonstrate an isosceles trapezoidal tooth profile. However, this disclosure does not limit the mover tooth 122 necessary to be a symmetric tooth profile. In practice, the tooth profile for the mover tooth can be an isosceles triangular tooth profile, an arc-shape tooth profile (as shown in FIG. 2C), an isosceles trapezoidal tooth profile, a symmetric tooth profile, or an asymmetric tooth profile (for example, a tooth profile having different contact surfaces).

In this embodiment, a mover pitch is equal to a sum of a mover-tooth base width D3 and a mover-tooth spacing d3. It shall be explained that the term "mover-tooth base width" herein stands for the width of the mover tooth 122 at the mover-tooth base 122c. By having FIG. 2A as an example, for the mover tooth 122 at the right hand side of the figure, the two mover-tooth contact surfaces 122a form respective connection points with the mover-tooth base 122c at the mover rack 121; i.e., a first end-point Q1 and a second end-point Q2, respectively. The mover-tooth base width is defined as the distance from the first end-point Q1 to the second end-point Q2. As shown in FIG. 2A, the first end-point Q1, the second end-point Q2 and a third end-point Q3 are all the lower ends of the mover-tooth contact surface 122a, i.e., the connection points of the mover-tooth contact surfaces 122a at the mover rack 121. In addition, the term "mover-tooth spacing" is defined to the minimum spacing between two neighboring mover teeth 122; i.e., the distance from one end point of a mover-tooth base 122c of a mover tooth 122 to an adjacent end point of another mover-tooth base 122c of a neighboring mover tooth 122. By having FIG. 2A as an example, the mover tooth 122 at the right hand side of the figure has a mover-tooth contact surface 122a and the corresponding first end-point Q1, and the mover tooth 122 at the left hand side of the figure has another mover-tooth contact surface 122a and the corresponding third end-point Q3. The distance from the first end-point Q1 to the third end-point Q3 is defined as the mover-tooth spacing. Further, the term "mover pitch" is defined to be the distance between two center points of respective mover-tooth tops 122b of two neighboring mover teeth 122. By having FIG. 2A as an example, a first center-point Q4 is the center of the mover-tooth top 122b for the mover tooth 122 at the right hand side of the figure, and a second center-point Q5 is the center of the mover-tooth top 122b for the mover tooth 122 at the left hand side of the figure. Namely, the line section that connects the first center-point Q4 and the second center-point Q5 is exactly the mover pitch. In FIG. 1, the mover pitch is equal to a sum of the mover-tooth base width D3 and the mover-tooth spacing d3.

Referring now back to FIG. 1, in this embodiment, the stator sets 11 include three stator sets; the first-set stator 11A, the second-set stator 11B and the third-set stator 11C. It shall be explained that this disclosure does not limit the number of the stators of the stator sets to be three. In some other embodiments not shown here, the stator sets 11 may include six stators, nine stators, or 3×n stators (n is an integer). By having the first-set stator 11A as a typical example, the stator 11A includes a plurality of stator racks 111 and an actuating component 113, in which each of the stator racks 111 has thereon a plurality of stator teeth 112.

In this embodiment, a plurality of stator teeth 112 is discretely arranged on the stator rack 111 in a predetermined periodical manner, and the tooth profile of the stator tooth 112 is a symmetric tooth profile. In this embodiment, the tooth profile for the stator teeth 112 is an isosceles trapezoidal tooth profile. Each of the stator teeth 112 includes two stator-tooth contact surfaces 112a, a stator-tooth top 112b and a stator-tooth base 112c. The two stator-tooth contact surfaces 112a, located oppositely to each other, are connected by the stator-tooth top 112b. The connection (point in the figure, but line in a 3D view not shown here) of the stator-tooth top 112b and each of the stator-tooth contact surface 112a can be seen as a deflected junction. Ends of the two stator-tooth contact surfaces 112a away from the stator-tooth top 112b are connected to the stator-tooth base 112c on the stator rack 111. In this embodiment, in a cross-sectional view, the two stator-tooth contact surfaces 112a, the stator-tooth top 112b and the stator-tooth base 112c are integrated to demonstrate an isosceles trapezoidal tooth profile. However, this disclosure does not limit the stator tooth 112 necessary to be a symmetric tooth profile. As shown in FIG. 2B, the tooth profile of the stator tooth 5 is an isosceles triangular tooth profile. This stator tooth 5 includes two stator-tooth contact surfaces 51 and a stator-tooth top 52. These two stator-tooth contact surfaces 51 are individually connected with the stator-tooth top 52. Namely, the stator-tooth top 52 is the bridge or junction of these two stator-tooth contact surfaces 51. In another embodiment shown in FIG. 2C, the profile of the stator tooth is an arc-shape tooth profile including two lateral surfaces 61 and an arc-shape surface 62. These two lateral surfaces 61 are connected to respective ends of the arc-shape surface 62. In particular, the arc-shape surface 62 is resembled in function to the aforesaid stator-tooth contact surface. In another embodiment, the tooth profile for the stator tooth can be a symmetric tooth profile, an isosceles triangular tooth profile, an arc-shape tooth profile, an isosceles trapezoidal tooth profile, or an asymmetric tooth profile (for example, a tooth profile having different contact surfaces).

In this embodiment, a stator pitch is equal to a sum of a stator-tooth base width D2 and a stator-tooth spacing d2. It shall be explained that the term "stator pitch" is defined to be the distance between two center points of respective stator-tooth tops 112b of two neighboring stator teeth 112. In FIG. 1, the stator pitch is equal to a sum of the stator-tooth base width D2 and the stator-tooth spacing d2. In addition, the term "stator-tooth base width" herein stands for the width of the stator tooth 112 at the stator-tooth base 112c. By having FIG. 2A as an example, the two stator-tooth contact surfaces 112a of the stator tooth 112 form respective connection points with the stator-tooth base 112c at the stator rack 111; i.e., a fourth end-point Q6 and a fifth end-point Q7, respectively. The stator-tooth base width is defined as the distance from the fourth end-point Q6 to the fifth end-point Q7. In addition, the term "stator-tooth spacing" is defined to the minimum spacing between two neighboring stator teeth 112; i.e., the distance from one end point of a stator-tooth base 112c of a stator tooth 112 to an adjacent end point of another stator-tooth base 112c of a neighboring stator tooth 112.

In this embodiment, the stator pitch is equal to the mover pitch. In other words, the sum of the stator-tooth base width D2 and the stator-tooth spacing d2 is equal to that of the mover-tooth base width D3 and the mover-tooth spacing d3. Referring to FIG. 1 and FIG. 2A, both of the stator-tooth spacing d2 and the mover-tooth spacing d3 are not zeros. In other words, the two stator-tooth bases 112c of two neighboring stator teeth 112 are spaced by a distance, and the two mover-tooth bases 122c of two neighboring mover teeth 122 are also spaced by another distance. In another embodiment (for example, the one shown in FIG. 10), the stator pitch is a sum of the stator-tooth base width D2 and the stator-tooth spacing d2. However, in FIG. 10, two mover-tooth bases of the neighboring mover teeth are connected directly, such that the mover-tooth spacing d3 is zero. Namely, the mover pitch is equal to the mover-tooth base width D3. In other words, in FIG. 10, the mover-tooth base width D3 is equal to the sum of the stator-tooth base width D2 and the stator-tooth spacing d2.

In this embodiment, the first-set stator 11A, the second-set stator 11B and the third-set stator 11C are orderly arranged in a moving direction L2. Referring to FIG. 1, though the moving direction L2 can be bidirectional, yet herein the first-set stator 11A, the second-set stator 11B and the third-set stator 11C are arranged from left to right in FIG. 1. Thus, the stator racks 111 of the first-set stator 11A, the second-set stator 11B and the third-set stator 11C are matched to different mover teeth 122 on the mover rack 121 of the mover 12. In this embodiment, structuring and arranging of the first-set stator 11A, the second-set stator 11B and the third-set stator 11C are all the same, and demonstrate no direct contact. However, inter-stator spacing D1 among these stator sets can be derived by equation (1) as follows:

$$n \times P < D1 \leq n \times P + Y \times D3 \tag{1}$$

Figure 4:
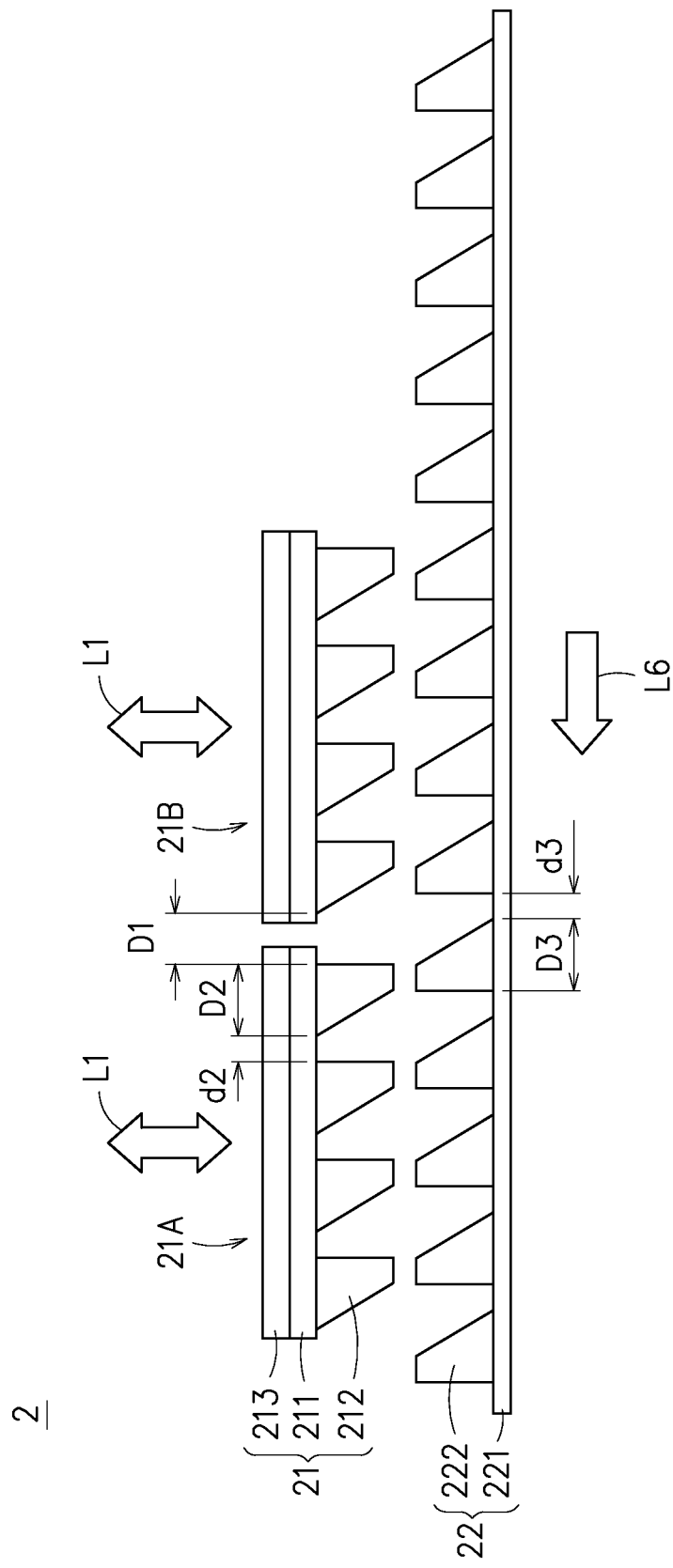
FIG. 4 is a schematic view of another embodiment of the ultrasonic linear actuation device in accordance with this disclosure.

In equation (1), P is the mover pitch (i.e., the stator pitch as well), Y is the modification coefficient, n is an integer, in which the modification coefficient is related to the tooth profile of the stator teeth. In FIG. 1, the tooth profile for the stator tooth 112 is a symmetric tooth profile, and thus Y=⅓. In FIG. 4, the tooth profile for the stator tooth 212 is an asymmetric tooth profile, and thus Y=½. Under the aforesaid definition of the inter-stator spacing D1 (referring to FIG. 1), as the first-set stator 11A is aligned with the mover 12, then each of the stator teeth 112 of the first-set stator 11A would be matched with the corresponding tooth gap between the two nearest mover teeth 122 of the mover 12. Since the second-set stator 11B and the first-set stator 11A are spaced by an inter-stator spacing D1, and since the inter-stator spacing D1 is equal to ⅓ of the mover-tooth base thickness D3 of the mover tooth 122, then any of the stator teeth 112 of the second-set stator 11B would be deviated from a correct match with the corresponding tooth gap between the two nearest mover teeth 122 of the mover 12. In this case, the stator tooth 112 of the second-set stator 11B and the mover 12 would be offset by a distance of ⅓ mover-tooth base width D3. Similarly, structuring and arranging of the third-set stator 11C and the first-set stator 11A are the same, and the third-set stator 11C and the second-set stator 11B do not contact directly. For the inter-stator spacing D1 to be equal to ⅓ of the mover-tooth base width D3 of the mover tooth 122, then, compared with the stator teeth 112 of the second-set stator 11B, the stator teeth 112 of the third-set stator 11C would be further offset by ⅓ of the mover-tooth base width D3 of the mover tooth 122. Thereupon, any of the stator teeth 112 of the third-set stator 11C will not stay at a positions right to match a corresponding tooth gap between the two nearest mover teeth 122 of the mover 12. At this time, the stator tooth 112 of the third-set stator 11C and the mover 12 would be offset by a distance of ⅔ mover-tooth base width D3. Thus, in this embodiment, through the design of the inter-stator spacing D1 between the stator sets 11, the stator tooth 112 of the stator sets 11 would be prevented from hitting the nearby mover-tooth top 122b of the mover 12 (see FIG. 2A). It shall be noted that, in the foregoing description, an example of aligning the first-set stator 21A with the mover 22 is used to elucidate the design of the inter-stator spacing. In another example, the state of aligning the third-set stator 11C with the mover 22 can be also introduced to explain the inclusion of the inter-stator spacing in this disclosure.

In this embodiment, the actuating component 113 is utilized to stimulate each of the stator sets 11 to generate corresponding standing-wave oscillations in an oscillation direction L1, in which the oscillation direction L1 is perpendicular to the moving direction L2. In this embodiment, the actuating component 113 is a piezoelectric actuator having piezoelectric films. By having the piezoelectric film top generate oscillation signals, then the first-set stator 11A, the second-set stator 11B and the third-set stator 11C will be stimulated by the oscillation signals to generate corresponding standing-wave oscillations.

However, this disclosure does not limit the types of the actuating component 113. In another embodiment, the actuating component can be an electrostatic actuator having comb structures. By utilizing two comb structures to induce electrostatic forcing so as further to generate oscillatory motions, then the first-set stator 11A, the second-set stator 11B and the third-set stator 11C can be stimulated to generate corresponding standing-wave oscillations. In a further embodiment, the actuating component can be an electromagnetic actuator having a rotor and a stator, at least one coil and at least one magnet or mild steel for generating oscillatory motions, then the first-set stator 11A, the second-set stator 11B and the third-set stator 11C can be stimulated to generate corresponding standing-wave oscillations.

Upon aforesaid arrangement, in this embodiment of the ultrasonic linear actuation device 1, the actuating component 113 is used to generate oscillatory motions for further stimulating the first-set stator 11A, the second-set stator 11B and the third-set stator 11C to generate orderly the standing-wave oscillations, such that the stator racks 111 of the first-set stator 11A, the second-set stator 11B and the third-set stator 11C can orderly contact the respective mover rack 121 of the mover 12. Thus, each of the stator racks 111 can mesh the mover rack 121, so that the mover 12 can be driven to displace in a moving direction L2.

Further, considering the required displacement for the rack to travel prior to a valid engagement, at least a length equal to a height of the rack tooth is necessary. In the art, the maximal displacement that a conventional piezoelectric actuator can contribute is about ¹⁄₁,₀₀₀ of the thickness of the piezoelectric actuator. If the required displacement is about 0.1 mm, then the thickness of the piezoelectric actuator shall be about 100 mm. Obviously, such a thickness could be hard to go with an effort in miniaturizing the device. On the other hand, the aforesaid embodiment provided by this disclosure is to utilize individual stator sets 11 to generate corresponding standing-wave oscillations. When the excited oscillations approach any of resonant frequencies, the vibrations will grow significantly, and so is the vibrational amplitudes. Thereby, the required displacement for the stator rack 111 to mesh the mover rack 121 would be met. Thereupon, the entire size (especially in thickness) of the ultrasonic linear actuation device 1 can be substantially reduced.

In addition, in this embodiment, each of the stator sets 11 would generate standing-wave oscillations. While the frequency of the standing wave approaches one of resonant frequencies, then the amplitude of the vibration of the stators 11 would be increased rapidly, so that the stator rack 111 is easy to mesh the mover rack 121. In addition, since the meshing of gear racks is a type of stiff contact, thus wear of related components can be reduced.

In addition, the output force of this embodiment is mainly the supportive force provided from the engagement of the stator rack 111 and the mover rack 121. In other words, the reason that the output force of this embodiment can be increased is because the conventional friction forcing is replaced by the meshing of gear racks in this embodiment. Thus, the embodiment of the ultrasonic linear actuation device 1 of this disclosure can provide a satisfied output force, even that the size thereof is reduced.

Figure 3A:
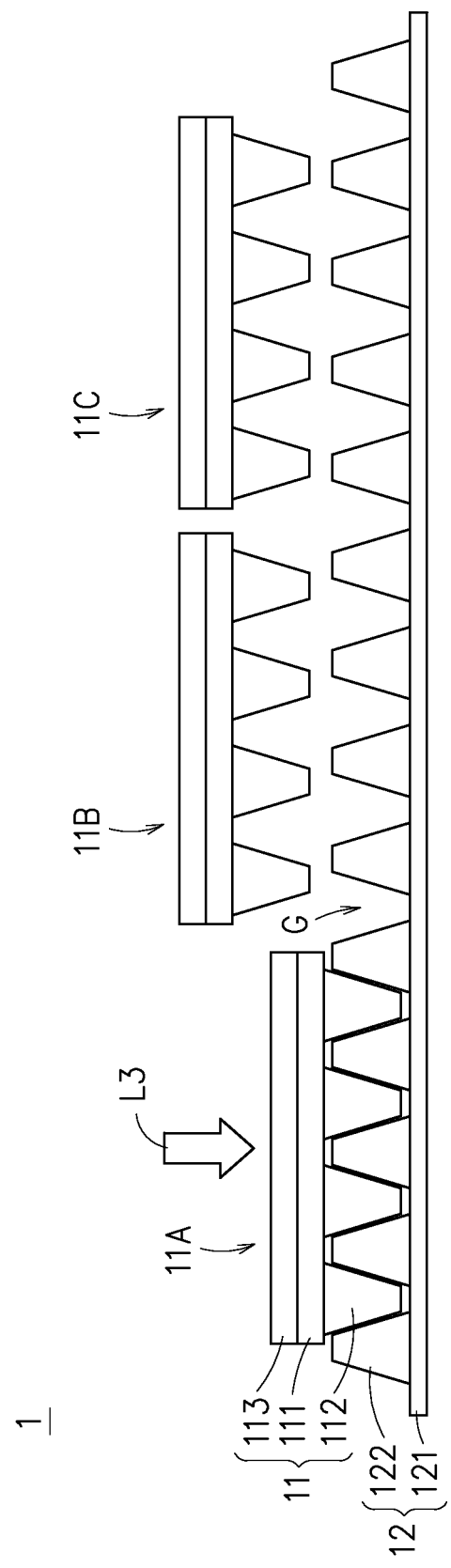
FIG. 3A demonstrates schematically a movement of the first-set stator of FIG. 1.
Figure 3B:
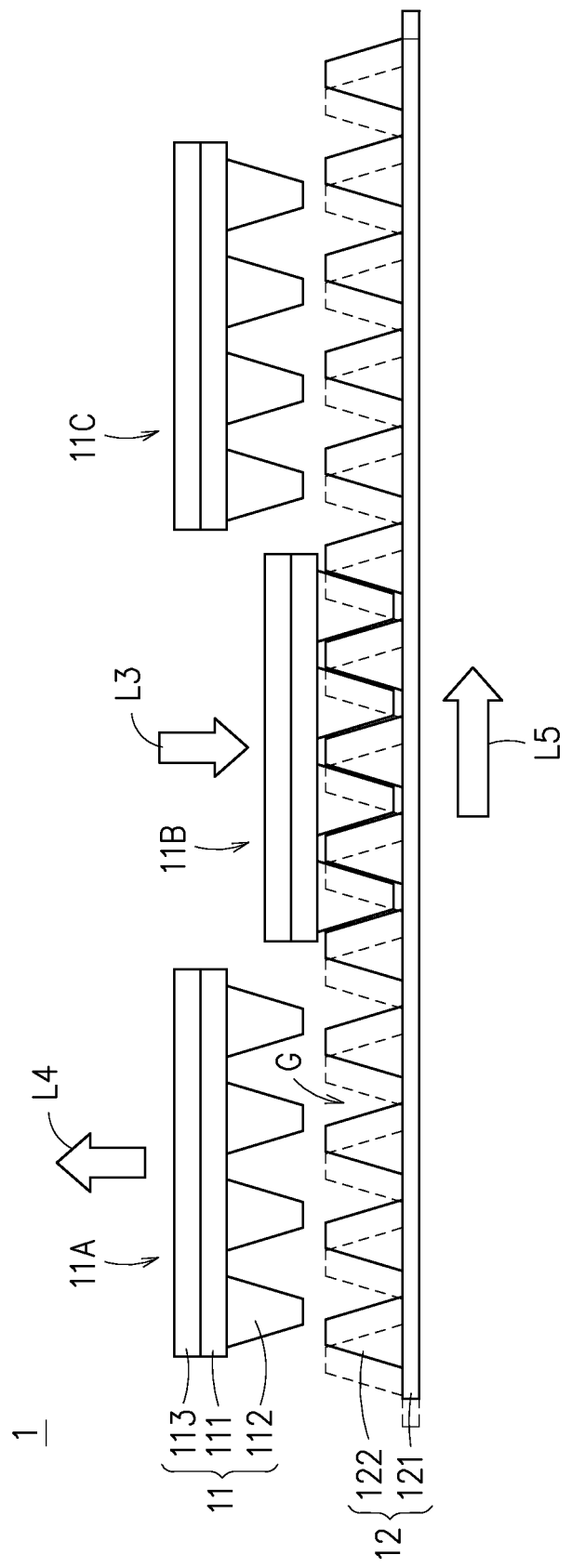
FIG. 3B demonstrates schematically a movement of the second-set stator of FIG. 1.
Figure 3C:
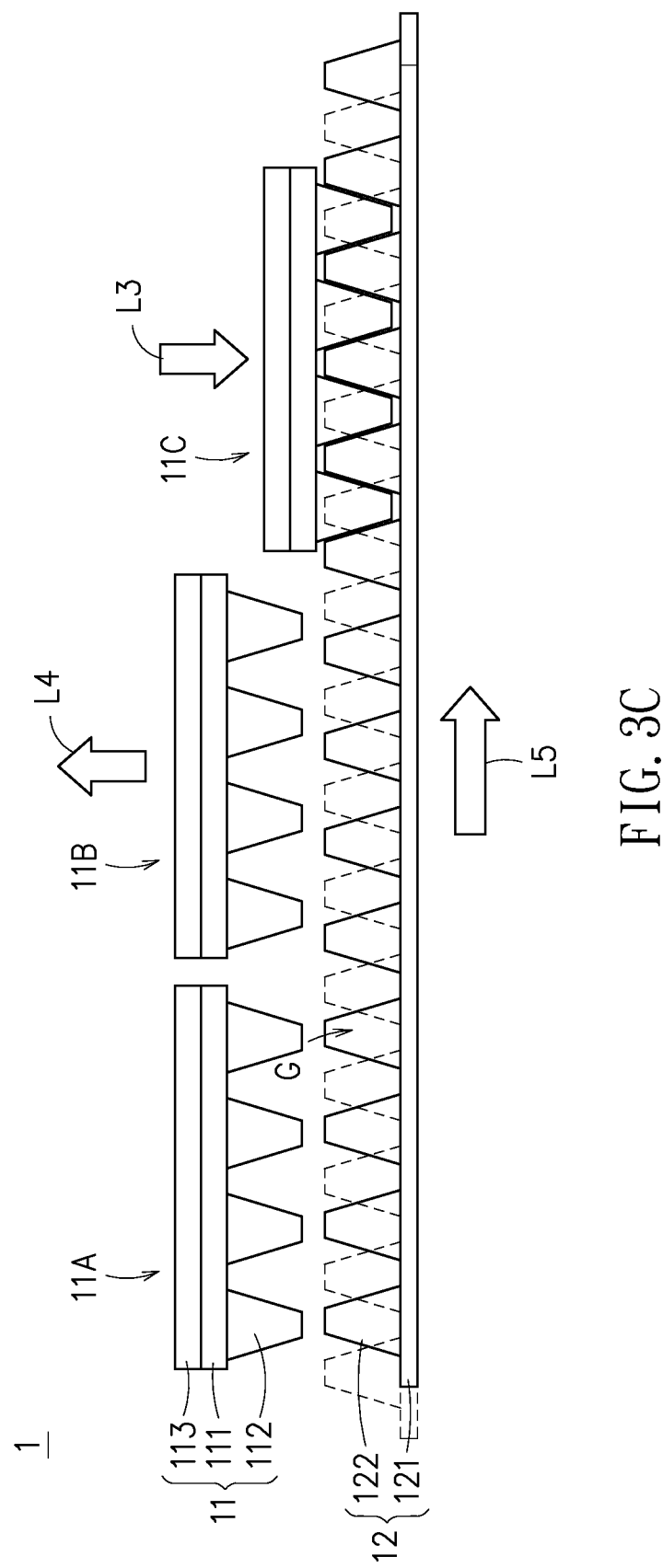
FIG. 3C demonstrates schematically a movement of the third-set stator of FIG. 1.

FIG. 3A to FIG. 3C demonstrate schematically and orderly different oscillation states of the stator sets. As shown, in this embodiment, the stator sets 11 include three stators; a first-set stator 11A, a second-set stator 11B and a third-set stator 11C. Two neighboring stators are spaced by an inter-stator spacing. The inter-stator spacing can be referred to that in FIG. 1, and thus details thereabout are omitted herein. The inter-stator spacing is equal to ⅓ of the mover-tooth base width of the mover rack 121, and the mover pitch is a sum of the mover-tooth base width and the mover-tooth spacing d3. In another embodiment, the inter-stator spacing of the stator sets 11 can be smaller than ⅓ of the mover-tooth base width of the mover rack 121.

In this embodiment, the actuating component 113 can perform a three-phase control order for exciting the stators to generate standing-wave oscillations orderly from the first-set stator 11A, the second-set stator 11B, the third-set stator 11C, the first-set stator 11A, the second-set stator 11B and the third-set stator 11C (i.e., from FIG. 3A, FIG. 3B, FIG. 3C, FIG. 3A, FIG. 3B and FIG. 3C). Following the aforesaid three-phase control order, the mover 12 can be shifted to the right of FIG. 3A (also, the moving direction L5 of FIG. 3B or FIG. 3C). Contrarily, the actuating component 113 performs another three-phase control order in a sequence of FIG. 3A, FIG. 3C, FIG. 3B, FIG. 3A, FIG. 3C and FIG. 3B to excite orderly the first-set stator 11A, the third-set stator 11C, the second-set stator 11B, the first-set stator 11A, the third-set stator 11C and the second-set stator 11B, respectively, for generating corresponding standing-wave oscillations, such that the mover 12 can be shifted to the left of FIG. 3A (also, reverse to the moving direction L5 of FIG. 3B or FIG. 3C). Thus, according to the aforesaid embodiment of this disclosure, the movement of the movers 12 can be controlled by performing specific mesh order of the stator sets and the mover rack. In other words, through periodical and intermittent movement of plural stator sets, the mover can be driven to move in a specific direction.

In detail, as shown in FIG. 3A, the actuating component 113 generates oscillatory motions to stimulate the first-set stator 11A to further generate corresponding standing-wave oscillations. While the first-set stator 11A generates the standing-wave oscillations, the first-set stator 11A would move in an engaging direction L3. As shown in FIG. 2A, the stator-tooth contact surface 112a would approach and finally contact the corresponding mover-tooth contact surface 122a, such that the stator rack 111 of the first-set stator 11A would engage the mover rack 121 so as thereby to move the mover 12.

Then, as shown in FIG. 3B, the actuating component 113 generates another oscillatory motions to stimulate the second-set stator 11B to further generate corresponding standing-wave oscillations, and, at the same time, the first-set stator 11A would move in a reset direction L4 to leave the respective mover rack 121. Then, the first-set stator 11A would be disengaged from the mover rack 121. While the second-set stator 11B generates standing-wave oscillations, the second-set stator 11B would move in the engaging direction L3, such that the stator rack 111 of the second-set stator 11B would engage the respective mover rack 121 so as to move the mover 12 forward in a moving direction L5, in which the moving direction L5 of the mover 12 is oblique to both the mover-tooth contact surface 122a and the mover-tooth top 122b. Thus, according to the embodiment of this disclosure, though stimulating orderly the first-set stator 11A and the second-set stator 11B, the mover 12 can be moved to the right of FIG. 3B in the moving direction L5.

It shall be explained that, during the process of the actuating component 113 stimulating orderly the first-set stator 11A and the second-set stator 11B, prior to the end of meshing between the stator rack 111 of the first-set stator 11A and the mover rack 121, the actuating component 113 can stimulate the second-set stator 11B in advance, such that the meshing time between the stator rack 111 and the mover rack 121 can be reduced.

Then, as shown in FIG. 3C, the actuating component 113 generates further oscillatory motions to stimulate the third-set stator 11C to further generate corresponding standing-wave oscillations, and, at the same time, the second-set stator 11B would move in the reset direction L4 to leave the respective mover rack 121. Then, the first-set stator 11A would be disengaged from the mover rack 121. While the third-set stator 11C generates standing-wave oscillations, the third-set stator 11C would move in the engaging direction L3, such that the stator rack 111 of the third-set stator 11C would engage the respective mover rack 121 so as to move the mover 12 forward in the moving direction L5, in which the moving direction L5 of the mover 12 is oblique to both the mover-tooth contact surface 122a and the mover-tooth top 122b. Thereupon, the mover 12 can be moved to the right of FIG. 3C in the moving direction L5 (i.e., to the right further in FIG. 3B in the moving direction L5).

It shall be explained that, during the process of the actuating component 113 stimulating orderly the second-set stator 11B and the third-set stator 11C, prior to the end of meshing between the stator rack 111 of the second-set stator 11B and the mover rack 121, the actuating component 113 can stimulate the third-set stator 11C in advance, such that the meshing time between the stator rack 111 and the mover rack 121 can be reduced.

Upon aforesaid arrangement of this embodiment, the actuating component 113 stimulates orderly each of the stator sets 11 to generate corresponding resonances and thus standing-wave oscillations, such that intermittent motions among plural stator sets 11 can be realized so as to move the mover 12 in a specific direction. In addition, a moving speed of the mover 12 can be determined by the frequency of switching the stator sets 11 and the least time for the standing-wave oscillation to reach the corresponding maximal amplitude.

Referring to FIG. 1, FIG. 2A, FIG. 3A, FIG. 3B and FIG. 3C, the tooth profile of the stator tooth 112 is a symmetric tooth profile, the tooth profile of the mover tooth 122 is also a symmetric tooth profile, the moving direction L5 of the mover 12 is oblique to both the mover-tooth contact surface 122a and the mover-tooth top 122b, and thus the mover 12 can be bidirectional driven, to either the right or the left.

Referring now to FIG. 4, a schematic view of another embodiment of the ultrasonic linear actuation device in accordance with this disclosure is shown. In this embodiment, the ultrasonic linear actuation device 2 includes two stator sets 21. The mover 22 includes a mover rack 221 and a plurality of mover teeth 222. It shall be explained that, though a mover rack 221 is shown in FIG. 4, yet this disclosure does not limit the number of the mover racks 221. In some other embodiments, plural mover racks 221 might be included.

Figure 5C:
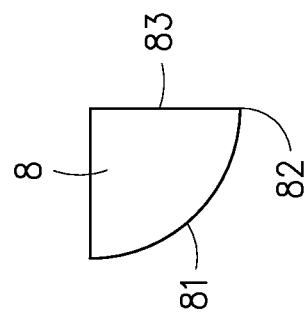
FIG. 5C is a schematic view of a further embodiment of the tooth profile for the stator tooth of FIG. 4.

In this embodiment, a plurality of mover teeth 222 is discretely arranged on the mover rack 221 in a periodical manner. Also, the tooth profile for the mover tooth 222 is an asymmetric tooth profile. As shown in FIG. 5A, the tooth profile for the mover teeth 222 is a right-angle trapezoidal tooth profile, and the neighboring mover teeth 222 are spaced by a tooth gap G. Each of the mover teeth 222 includes a mover-tooth contact surface 222a, a mover-tooth top 222b, a vertical lateral surface 222c and a mover-tooth base 222d. The mover-tooth contact surface 222a is located oppositely to the vertical lateral surface 222c, and the mover-tooth base 222d on the mover rack 221 is located oppositely to the mover-tooth top 222b. Two opposite ends of the mover-tooth top 222b are connected respectively with one end of the mover-tooth contact surface 222a and one end of the vertical lateral surface 222c. The connection (point in the figure, but line in a 3D view not shown here) of the mover-tooth top 222b and each of the mover-tooth contact surface 222a and the vertical lateral surface 222c can be seen as a deflected junction. Another end of the mover-tooth contact surface 222a away from the mover-tooth top 222b and another end of the vertical lateral surface 222c away from the mover-tooth top 222b are individually connected to opposite ends of the mover-tooth base 222d on the mover rack 221. In this embodiment, in a cross-sectional view, the mover-tooth contact surfaces 222a, the mover-tooth top 222b, the vertical lateral surface 222c and the mover-tooth base 222d are integrated to demonstrate a right-angle trapezoidal tooth profile. However, this disclosure does not limit the mover tooth 122 necessary to be an asymmetric tooth profile. In practice, the tooth profile for the mover tooth can be a right-angle tooth profile, a right-angle trapezoidal tooth profile, an arc-shape tooth profile (as shown in FIG. 5C), or any asymmetric tooth profile (for example, a tooth profile having different contact surfaces).

In this embodiment, the mover pitch (also referred to FIG. 1) is equal to a sum of the mover-tooth base width D3 and the mover-tooth spacing d3, in which the mover-tooth base width D3 herein stands for the width of the mover tooth 222 at the mover-tooth base 222d, and the mover-tooth spacing d3 stands for the distance from one end of the mover-tooth base 222d on the mover tooth 222 to the corresponding end of the mover-tooth base 222d on the neighboring mover tooth 222.

Referring now back to FIG. 4, in this embodiment, the stator sets 11 include two stator sets; the first-set stator 21A and the second-set stator 21B. It shall be explained that this disclosure does not limit the number of the stators of the stator sets to be two. In some other embodiments not shown here, the stator sets 21 may include four stators, six stators, eight stators or 2×n stators (n is an integer). By having the first-set stator 21A as a typical example, the stator 21A includes a stator rack 211, a plurality of stator teeth 212 and an actuating component 213.

In this embodiment, a plurality of stator teeth 212 are discretely arranged on the stator rack 211 in a predetermined periodical manner, and the tooth profile of the stator tooth 212 is an asymmetric tooth profile. In this embodiment, the tooth profile for the stator teeth 212 is a right-angle trapezoidal tooth profile. Each of the stator teeth 212 includes a stator-tooth contact surface 212a, a stator-tooth top 212b, a vertical lateral surface 212c and a stator-tooth base 212d. The stator-tooth contact surface 212a is located oppositely to the vertical lateral surface 212c, and the stator-tooth base 212d on the stator rack 211 is located oppositely to the stator-tooth top 212b. Two opposite ends of the stator-tooth top 212b are connected respectively with one end of the stator-tooth contact surface 212a and one end of the vertical lateral surface 212c. The connection (point in the figure, but line in a 3D view not shown here) of the stator-tooth top 212b and each of the stator-tooth contact surface 212a and the vertical lateral surface 212c can be seen as a deflected junction. Another end of the stator-tooth contact surface 212a away from the stator-tooth top 212b and another end of the vertical lateral surface 212c away from the stator-tooth top 212b are individually connected to opposite ends of the stator-tooth base 212d on the stator rack 211. In this embodiment, in a cross-sectional view, the stator-tooth contact surface 212a, the stator-tooth top 212b, the vertical lateral surface 212c and the stator-tooth base 212d are integrated to demonstrate a right-angle trapezoidal tooth profile.

However, this disclosure does not limit the stator tooth 212 necessary to be an asymmetric tooth profile. In practice, the tooth profile for the mover tooth can be a right-angle tooth profile, a right-angle trapezoidal tooth profile, an arc-shape tooth profile (as shown in FIG. 5C), or any asymmetric tooth profile (for example, a tooth profile having different contact surfaces).

Figure 5B:
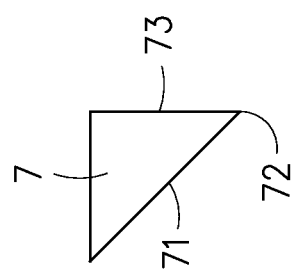
FIG. 5B is a schematic view of another embodiment of the tooth profile for the stator tooth of FIG. 4.
Figure 5A:
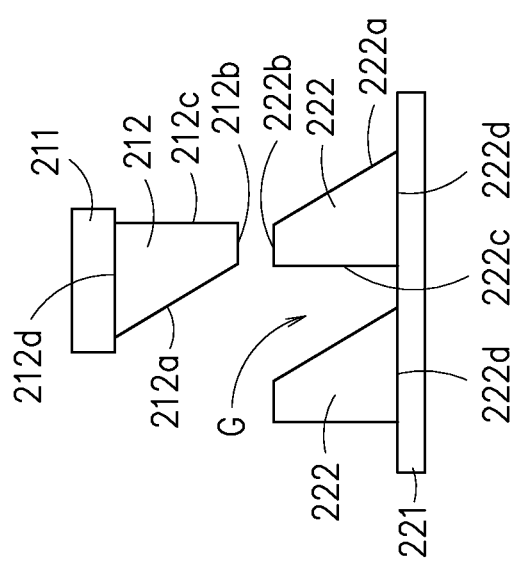
FIG. 5A is a schematic view of the tooth profile for both the stator tooth and the mover tooth of FIG. 4.

In another embodiment shown In FIG. 5B, the tooth profile of the stator tooth 7 is a right-angle tooth profile, and the stator tooth 7 includes a stator-tooth contact surface 71, a stator-tooth top 72 and a vertical lateral surface 73. The stator-tooth contact surface 71 and the vertical lateral surface 73 are individually connected with the stator-tooth top 72; i.e., the stator-tooth top 72 is a connection or a deflected point of the stator-tooth contact surface 71 and the vertical lateral surface 73.

In another embodiment as shown in FIG. 5C, the tooth profile of the stator tooth 8 is an arc-shape tooth profile, and the stator tooth 8 includes an arc-shape surface 81, a stator-tooth top 82 and a vertical lateral surface 83. The arc-shape surface 81 and the vertical lateral surface 83 are individually connected with the stator-tooth top 82; i.e., the stator-tooth top 82 is a connection or a deflected point of the arc-shape surface 81 and the vertical lateral surface 83. In this embodiment, the arc-shape surface 81 has an arc profile having a function resembled to the aforesaid stator-tooth contact surface. In another embodiment, the tooth profile of the stator tooth can be an asymmetric tooth profile, a right-angle tooth profile, an arc-shape tooth profile, a right-angle trapezoidal tooth profile, or any combination of at least two tooth profiles.

In this embodiment, the stator pitch is equal to a sum of a stator-tooth base width D2 and a stator-tooth spacing d2, in which the definition of the term "stator pitch" can be referred to the aforesaid embodiment of FIG. 1. The term "stator-tooth base width" herein stands for the width of the stator tooth 212 at the stator-tooth base 212d, and the stator-tooth spacing d2 stands for the distance from one end of the stator-tooth base 212d on the stator tooth 212 to the corresponding end of the stator-tooth base 212d on the neighboring stator tooth 212. In addition, in this embodiment, the stator pitch is equal to the mover pitch. Namely, the sum of the stator-tooth base width D2 and the stator-tooth spacing d2 is equal to that of the mover-tooth base width D3 and the mover-tooth spacing d3. By having the embodiment shown in FIG. 4 and FIG. 5A as an example, both of the stator-tooth spacing d2 and the mover-tooth spacing d3 are not zeros. In other words, the two stator-tooth bases 212c of two neighboring stator teeth 212 are spaced by a distance, and the two mover-tooth bases 212d of two neighboring mover teeth 222 are also spaced by another distance. In another embodiment (for example, the one shown in FIG. 10), the stator pitch is a sum of the stator-tooth base width D2 and the stator-tooth spacing d2. However, in FIG. 10, two mover-tooth bases of the neighboring mover teeth are connected directly, such that the mover-tooth spacing d3 is zero. Namely, the mover pitch is equal to the mover-tooth base width D3. In other words, in FIG. 10, the mover-tooth base width D3 is equal to the sum of the stator-tooth base width D2 and the stator-tooth spacing d2.

In this embodiment, the stator racks 211 of the first-set stator 21A and the second-set stator 21B are matched to different mover teeth 222 on the mover rack 221 of the mover 22. In this embodiment, structuring and arranging of the first-set stator 21A and the second-set stator 21B are both the same, and demonstrate no direct contact. However, inter-stator spacing D1 between these two stator sets can be derived by equation (1) as described. As the first-set stator 21A is aligned with the mover 22, then each of the stator teeth 212 of the first-set stator 21A would be matched with the corresponding tooth gap between the two nearest mover teeth 222 of the mover 22. Since the second-set stator 21B and the first-set stator 21A are spaced by an inter-stator spacing D1, and since the inter-stator spacing D1 is equal to ½ of the mover-tooth base width D3 of the mover tooth 222, then any of the stator teeth 212 of the second-set stator 21B would be deviated from a correct match with the corresponding tooth gap between the two nearest mover teeth 222 of the mover 22. In this case, the stator tooth 212 of the second-set stator 21B and the mover 22 would be offset by a distance of ½ mover-tooth base width D3. Thereupon, any of the stator teeth 112 of the third-set stator 11C will not stay at a positions right to match a corresponding tooth gap between the two nearest mover teeth 122 of the mover 12. At this time, the stator tooth 112 of the third-set stator 11C and the mover 12 would be offset by a distance of ⅔ mover-tooth base width D3. In another embodiment, the inter-stator spacing D1 between the second-set stator 21B and the first-set stator 21A can be less than ½ mover-tooth base width of the mover rack 221. It shall be explained that, in the foregoing example, the inter-stator spacing is elucidated by having the first-set stator 21A to align with the mover 22. However, in some other embodiments, the inter-stator spacing is elucidated by having the second-set stator 21B to align with the mover 22.

Referring back to FIG. 4, in this embodiment, structuring and functions of the actuating component 213 are similar to those of the actuating component 113 of FIG. 1. Namely, the actuating component 213 is used for stimulating each of the stator sets 21 to generate standing-wave oscillations in an oscillation direction L1, in which the oscillation direction L1 is perpendicular to the moving direction L6.

Upon aforesaid arrangement of this embodiment of the ultrasonic linear actuation device 2, the actuating component 213 generates oscillatory motions to stimulate orderly the first-set stator 21A and the second-set stator 21B so as to generate corresponding standing-wave oscillations, so that a plurality of stator racks 211 of the first-set stator 21A and a plurality of stator racks 211 of the second-set stator 21B would contact orderly the corresponding mover racks 221 of the mover 22. Thereupon, each of the stator racks 211 can mesh with the corresponding mover racks 221, such that the mover 22 can be driven to displace in a moving direction L6.

Further, this embodiment can utilize the actuating component 113 to stimulate orderly the stator sets 21 to generate resonances and thus standing-wave oscillations, such that intermittent motions among plural stator sets 11 can be realized so as to move the mover 22 in a specific direction. By having FIG. 4 as an example, the tooth profile of the stator tooth 212 is an asymmetric tooth profile, the tooth profile of the mover tooth 222 is also an asymmetric tooth profile, the moving direction L6 of the mover 22 is oblique to both the mover-tooth contact surface 222a and the mover-tooth top 222b, and thus the mover 22 can undergo a unidirectional motion to the left of FIG. 4.

In addition, this embodiment utilizes each of the stator sets 21 to generate corresponding standing-wave oscillations. When the excited oscillations approach any of resonant frequencies, the vibrations will grow significantly, and so is the vibrational amplitudes of the stator 21. Thereby, the required displacement for the stator rack 211 to mesh the mover rack 221 would be met. Thereupon, the entire size (especially in thickness) of the ultrasonic linear actuation device 2 can be substantially reduced.

In addition, in this embodiment, each of the stator sets 21 would generate standing-wave oscillations. While the frequency of the standing wave approaches one of resonant frequencies, then the amplitude of the vibration of the stators 21 would be increased rapidly, so that the stator rack 211 is easy to mesh the mover rack 221. In addition, since the meshing of gear racks is a type of stiff contact, thus wear of related components can be reduced.

In addition, the output force of this embodiment is mainly the supportive force provided from the engagement of the stator rack 211 and the mover rack 221. In other words, the reason that the output force of this embodiment can be increased is because the conventional friction forcing is replaced by the meshing of gear racks in this embodiment. Thus, the embodiment of the ultrasonic linear actuation device 2 of this disclosure can provide a satisfied output force, even that the size thereof is reduced.

Figure 6:
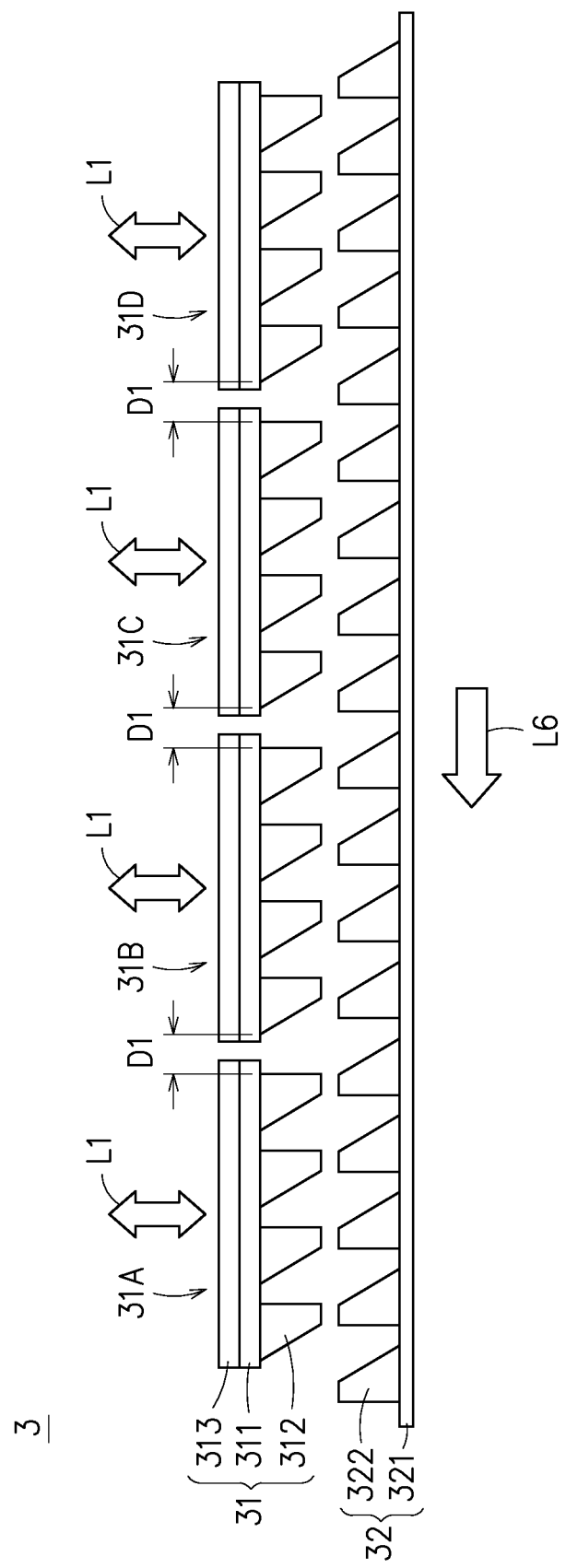
FIG. 6 is a schematic view of a further embodiment of the ultrasonic linear actuation device in accordance with this disclosure.

Referring now to FIG. 6, a further embodiment of the ultrasonic linear actuation device 3 in accordance with this disclosure is schematically shown. In this embodiment, the ultrasonic linear actuation device 3 includes four stator sets 31 and a mover 32. The mover 32 includes a mover rack 321 and a plurality of mover teeth 322. It shall be explained that, thought a mover rack 321 is shown in FIG. 6, yet this disclosure does not limit the number of the mover racks in the ultrasonic linear actuation device. In some other embodiments not shown here, the ultrasonic linear actuation device might include a plurality of the mover racks.

In this embodiment, a plurality of mover teeth 322 is discretely arranged on the mover rack 321 in a periodical manner. Also, the tooth profile for the mover tooth 322 is an asymmetric tooth profile. In some other embodiments, the tooth profile for the mover teeth 322 can be a right-angle tooth profile, a right-angle trapezoidal tooth profile, an arc-shape tooth profile (as shown in FIG. 5C), or any asymmetric tooth profile (for example, a tooth profile having different contact surfaces).

In this embodiment, the stator sets 31 has four stators; a first-set stator 31A, a second-set stator 31B, a third-set stator 31C and a fourth-set stator 31D. Each stator of the stator sets 31 includes a stator rack 311, a plurality of stator teeth 312 and an actuating component 313. The stator racks 311 of the first-set stator 31A, the second-set stator 31B, the third-set stator 31C and the fourth-set stator 31D are in correspondence with the mover teeth 322 at different sections of the mover racks 321 of the mover 32.

In this embodiment, a plurality of stator teeth 312 is discretely arranged on the stator rack 311 in a periodical manner. Also, the tooth profile for the stator tooth 312 is an asymmetric tooth profile. This asymmetric tooth profile can be a right-angle trapezoidal tooth profile as shown in FIG. 5A. In some other embodiments, the tooth profile for the stator teeth 312 can be a right-angle tooth profile as shown in FIG. 5B, a right-angle trapezoidal tooth profile, an arc-shape tooth profile as shown in FIG. 5C, or any asymmetric tooth profile (for example, a tooth profile having different contact surfaces).

In this embodiment, structuring and arranging of the first-set stator 31A and the second-set stator 31B are both the same, and demonstrate no direct contact. However, an inter-stator spacing D1 between these two stator sets can be derived by equation (1) as described. As the first-set stator 31A is aligned with the mover 32, then each of the stator teeth 312 of the first-set stator 31A would be matched with the corresponding tooth gap between the two nearest mover teeth 322 of the mover 32. Since the second-set stator 31B and the first-set stator 31A are spaced by an inter-stator spacing D1, and since the inter-stator spacing D1 is equal to ½ of the mover-tooth base width of the mover tooth 322, then any of the stator teeth 312 of the second-set stator 31B would be deviated from a correct match with the corresponding tooth gap between the two nearest mover teeth 322 of the mover 32. In this case, the stator tooth 312 of the second-set stator 31B and the mover 32 would be offset by a distance of ½ mover-tooth base width. In another embodiment, the inter-stator spacing D1 between the second-set stator 31B and the first-set stator 31A can be less than ½ mover-tooth base width of the mover rack 321. Similarly, structuring and arranging of the first-set stator 31A and the third-set stator 31C are both the same, and demonstrate no direct contact between the third-set stator 31C and the second-set stator 31B. Since the inter-stator spacing D1 here is equal to ½ of the mover-tooth base width of the mover tooth 322, then any of the stator teeth 312 of the third-set stator 31C would be further deviated by a distance of ½ mover-tooth base width with respect to the second-set stator 31B, such that the stator teeth 312 of the third-set stator 31C would be right matched with the corresponding tooth gap between the two nearest mover teeth 322 of the mover 32. In another embodiment, the inter-stator spacing D1 between the second-set stator 31B and the third-set stator 31C can be less than ½ mover-tooth base width of the mover rack 321. Similarly, structuring and arranging of the first-set stator 31A and the fourth-set stator 31D are both the same, and demonstrate no direct contact between the third-set stator 31C and the fourth-set stator 31D. Since the inter-stator spacing D1 here is equal to ½ of the mover-tooth base width of the mover tooth 322, then any of the stator teeth 312 of the fourth-set stator 31D would be further deviated by a distance of ½ mover-tooth base width with respect to the third-set stator 31C, such that the stator tooth 312 of the fourth-set stator 31D and the mover 32 would be offset by a distance of ½ mover-tooth base width. In another embodiment, the inter-stator spacing D1 between the fourth-set stator 31D and the third-set stator 31C can be less than ½ mover-tooth base width of the mover rack 321. Thus, in this embodiment, through the design of the inter-stator spacing D1 between the stator sets 31, the stator tooth 312 of the stator sets 31 would be prevented from hitting the nearby mover-tooth top of the mover rack 321 of the mover 32. It shall be explained that, in the foregoing example, the inter-stator spacing is elucidated by having the first-set stator 31A to align with the mover 32. However, in some other embodiments, the inter-stator spacing can be elucidated by having the fourth-set stator 31D to align with the mover 32.

In this embodiment, structuring and functions of the actuating component 313 are similar to those of the actuating component 113 of FIG. 1. The actuating component 313 is used for stimulating individual stator sets 31 to generate corresponding standing-wave oscillations in an oscillation direction L1, in which the oscillation direction L1 is perpendicular to the moving direction L6. A major difference between embodiments of FIG. 6 and FIG. 4 is that, in this embodiment, the actuating component 313 stimulates the first-set stator 31A and the third-set stator 31C simultaneously, and next the second-set stator 31B and the fourth-set stator 31D at another simultaneous timing.

Upon aforesaid arrangement of this embodiment of the ultrasonic linear actuation device 3, the actuating component 313 generates oscillatory motions to stimulate orderly each of the stator sets 31 so as to generate corresponding standing-wave oscillations, so that the stator racks 311 of the first-set stator 31A, the second-set stator 31B, the third-set stator 31C and the fourth-set stator 31D would contact orderly the corresponding mover racks 321 of the mover 32. Thereupon, each of the stator racks 311 can mesh with the corresponding mover racks 321, such that the mover 32 can be driven to displace in the moving direction L6.

Further, this embodiment can utilize the actuating component 113 to stimulate orderly the stator sets 31 to generate resonances and thus standing-wave oscillations, such that intermittent motions among plural stator sets 31 can be realized so as to move the mover 32 in a specific direction. By having FIG. 6 as an example, the tooth profile of the stator tooth 312 is an asymmetric tooth profile, the tooth profile of the mover tooth 322 is also an asymmetric tooth profile, and thus the mover 32 can be driven to undergo a unidirectional motion to the left of FIG. 6 (i.e., the moving direction L6). Further, in this embodiment, timing control is applied to have two of the stator sets 31 to mesh first, and then another two thereof to mesh next, such that the moving speed of the mover 32 can be effectively raised. In other words, in this embodiment, through controlling the switch frequency and standing-wave oscillations of the stator sets 31, the meshing efficiency between racks can be substantially enhanced to displace the mover 32.

In addition, this embodiment utilizes each of the stator sets 31 to generate corresponding standing-wave oscillations. When the excited oscillations approach any of resonant frequencies, the vibrations will grow rapidly, and so is the vibrational amplitudes of the stator 31. Thereby, the required displacement for the stator rack 311 to mesh the mover rack 321 would be obtained. Thereupon, the entire size (especially in thickness) of the ultrasonic linear actuation device 3 can be substantially reduced. In addition, as the amplitude of the vibration of the stators 31 is increased rapidly, the stator rack 311 would be much easier to mesh the mover rack 321. Also, since the meshing of gear racks is a type of stiff contact, thus wear of related components can be reduced.

In addition, the output force of this embodiment is mainly the supportive force provided from the engagement of the stator rack 311 and the mover rack 321. In other words, the reason that the output force of this embodiment can be increased is because the conventional friction force is replaced by the meshing of gear racks in this embodiment. Thus, the embodiment of the ultrasonic linear actuation device 3 of this disclosure can provide a satisfied output force, even that the size thereof is reduced.

Figure 7:
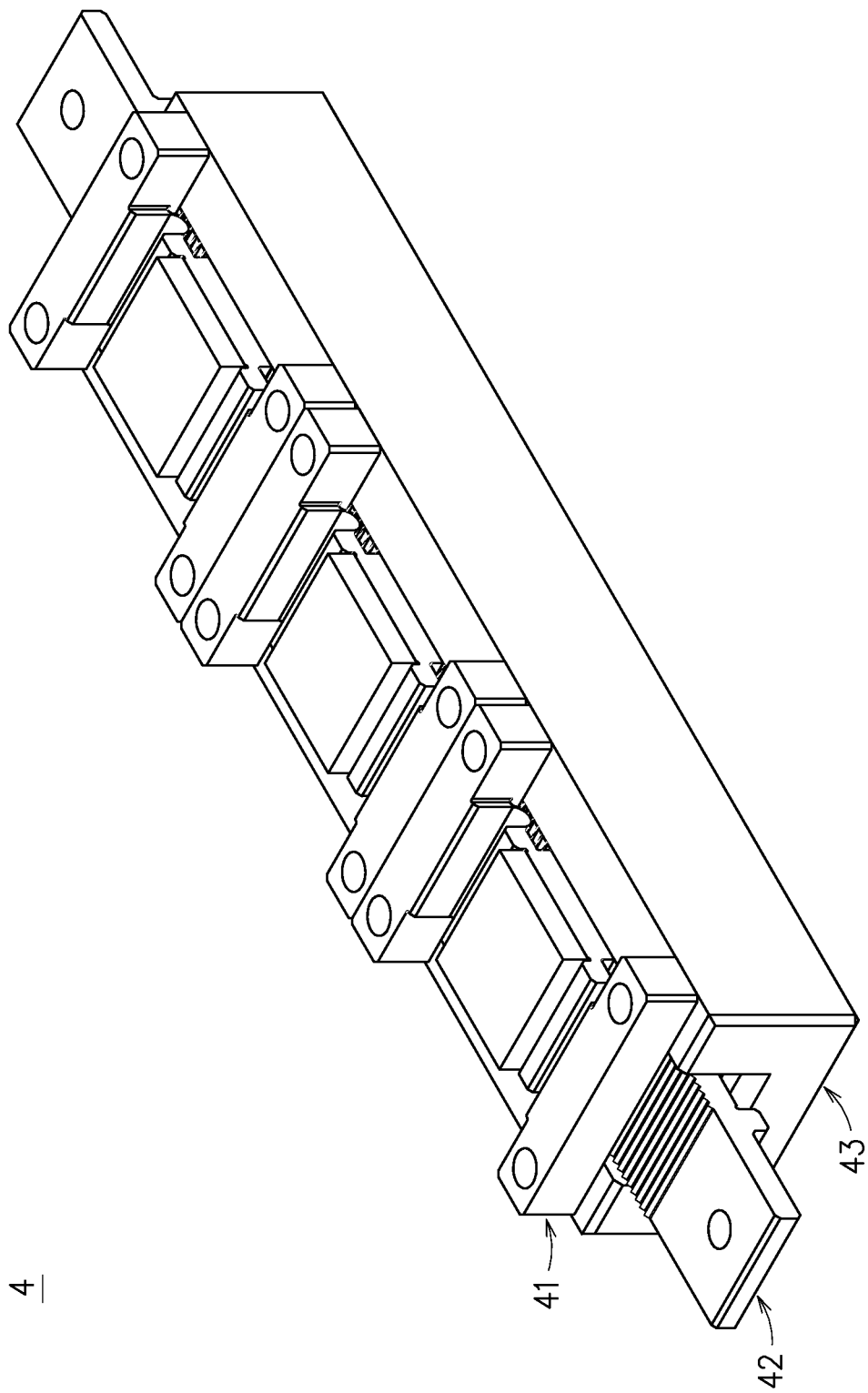
FIG. 7 is a schematic perspective view of one more embodiment of the ultrasonic linear actuation device in accordance with this disclosure.
Figure 8:
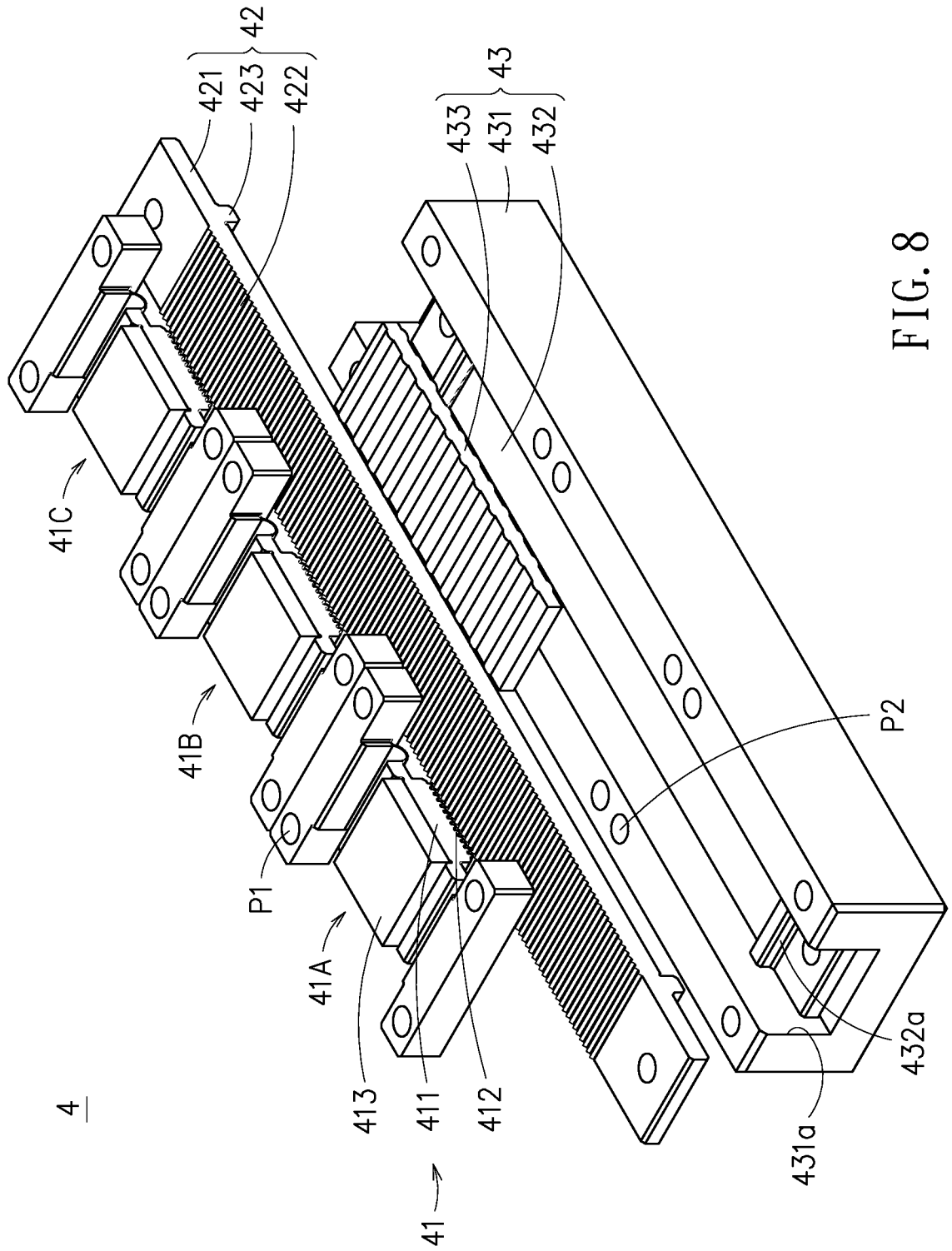
FIG. 8 is a schematic exploded view of FIG. 7.
Figure 9:
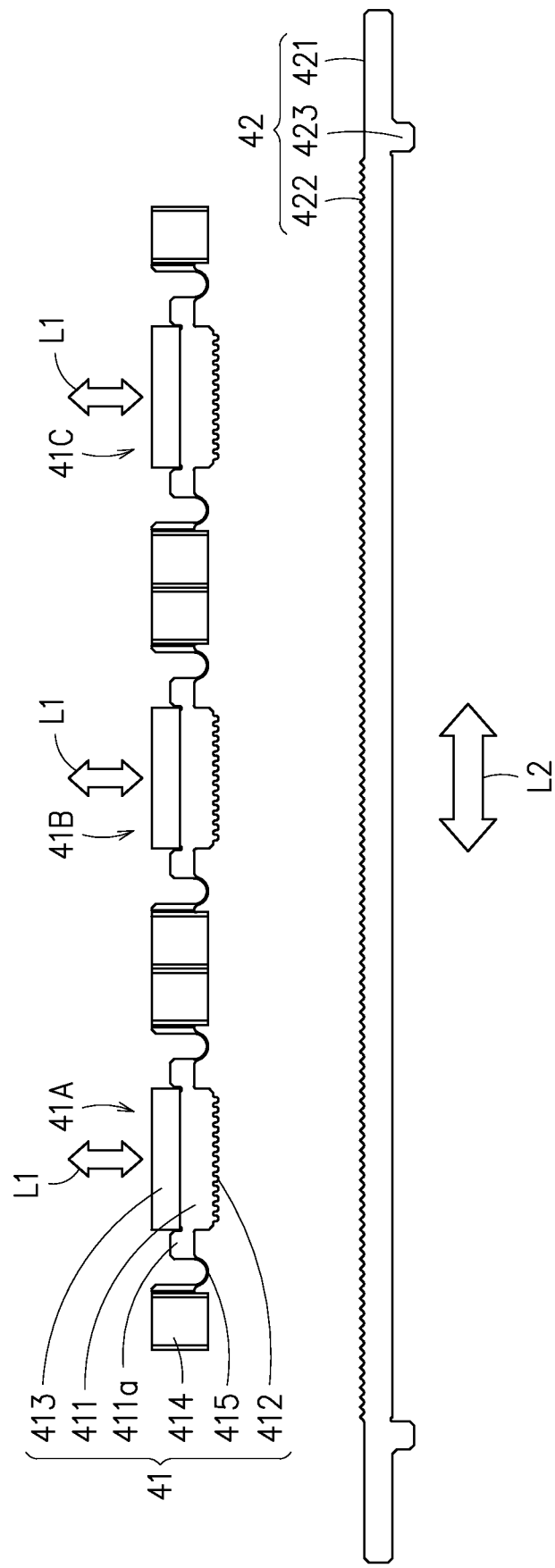
FIG. 9 is a schematic lateral-side view of plural stator sets and a mover of FIG. 7.
Figure 10:
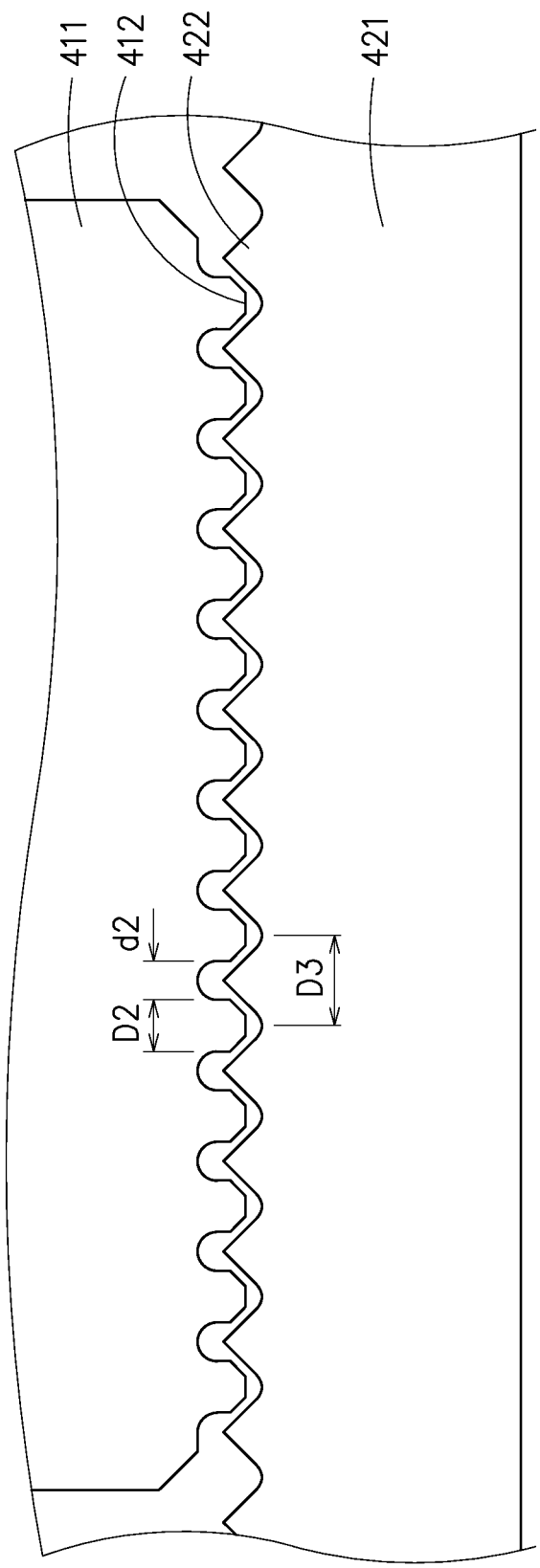
FIG. 10 demonstrates schematically meshing of the stator rack and the mover rack of FIG. 9.

Refer now to FIG. 7 through FIG. 10; where FIG. 7 is a schematic perspective view of one more embodiment of the ultrasonic linear actuation device in accordance with this disclosure, FIG. 8 is a schematic exploded view of FIG. 7, FIG. 9 is a schematic lateral-side view of plural stator sets and a mover of FIG. 7, and FIG. 10 demonstrates schematically meshing of the stator rack and the mover rack of FIG. 9. As shown, in this embodiment, the ultrasonic linear actuation device 4 includes a plurality of stator sets 41, a mover 42 and a moving guide mechanism 43. The stator sets 41 include three stator; a first-set stator 41A, a second-set stator 41B and a third-set stator 41C. The first-set stator 41A, the second-set stator 41B and the third-set stator 41C are orderly arranged in a moving direction L2. As shown in FIG. 9, since the moving direction L2 is bidirectional, thus the moving direction L2 can be a direction from left to right of FIG. 9 so as to mesh stator racks 411 of the first-set stator 41A, the second-set stator 41B and the third-set stator 41C to respective mover teeth 422 of the mover rack 421 of the mover 42.

In this embodiment, no direct contact among stator sets exists, but a relative spacing relationship there-among does exist. As shown, an inter-stator spacing D1 between any two stator sets can be derived by equation (1) as described. As the first-set stator 41A is aligned with the mover 42, then each of the stator teeth 412 of the first-set stator 41A would be matched with the corresponding tooth gap between the two nearest mover teeth 422 of the mover 42. Since the neighboring stators are spaced by an inter-stator spacing D1, and since the inter-stator spacing D1 is equal to ⅓ of the mover-tooth base width of the mover tooth 422, then, at this time, any of the stator teeth 412 of the second-set stator 41B would be deviated from a correct match with the corresponding tooth gap between the two nearest mover teeth 422 of the mover 42 by a distance of ⅓ mover-tooth base width, and any of the stator teeth 412 of the third-set stator 41C would be deviated from a correct match with the corresponding tooth gap between the two nearest mover teeth 422 of the mover 42 by a distance of ⅔ mover-tooth base width.

In this embodiment, a plurality of stator teeth 412 is discretely arranged on the stator rack 411 in a periodical manner. Also, the tooth profile for the stator tooth 412 can be a triangular tooth profile, a trapezoidal tooth profile, an arc-shape tooth profile, or a combination of at least two of the preceding tooth profiles. As shown in FIG. 10, the tooth profile for the stator teeth 412 is an isosceles trapezoidal tooth profile. In another embodiment, the tooth profile for the stator teeth 412 can be an isosceles triangular tooth profile, an arc-shape tooth profile, or any symmetric tooth profile (for example, a tooth profile having the same contact surfaces).

On the other hand, the mover 42 includes a mover rack 421, a plurality of mover teeth 422 and two flanges 423. The two flanges 423 and the plurality of mover teeth 422 are arranged to opposing surfaces of the mover rack 421. The plurality of mover teeth 422 are discretely arranged on the mover rack 421 in a periodical manner. Also, the tooth profile for the mover tooth 422 can be a triangular tooth profile, a trapezoidal tooth profile, an arc-shape tooth profile, or a combination of at least two of the preceding tooth profiles. As shown in FIG. 10, the tooth profile for the mover teeth 422 is an isosceles triangular tooth profile. In another embodiment, the tooth profile for the mover teeth 422 can be an isosceles trapezoidal tooth profile, an arc-shape tooth profile, or any symmetric tooth profile (for example, a tooth profile having the same contact surfaces).

Referring back to FIG. 7, FIG. 8 and FIG. 9, the mover 42 is moved on the moving guide mechanism 43. In this embodiment, the moving guide mechanism 43 includes a base body 431, a constraint member 432 and a sliding member 433. However, this disclosure does not limit the type of the moving guide mechanism. In another embodiment, the moving guide mechanism can be a linear rail guide having sliders and rails.

In this embodiment, the base body 431 includes a groove 431a, and the constraint member 432 is located inside the groove 431a of the base body 431. Each of two opposing ends of the constraint member 432 is furnished with a stop member 432a. The sliding member 433, movably disposed on the constraint member 432, can be a plurality of parallel rolling pins, each of which has a length less than a width of the constraint member 432, in which the longitudinal direction of the constraint member 432 is parallel to the moving direction L2. The mover teeth 422 of the mover 42 face the stator teeth 412 of the stator 41. The surface of the mover 42 furnished with the flanges 423 is to slide on the sliding member 433, and the sliding member 433 is further to slide between the two stop members 432a of the constraint member 432, such that the stroke of the mover 42 in the moving direction L2 can be defined. In addition, sidewalls of the groove 431a would restrain the mover 42 to displace only in the longitudinal direction of the base body 431 (i.e., the moving direction L2).

In this embodiment, the stator sets 41 include a stator rack 411, a plurality of stator teeth 412, an actuating component 413, a positioning member 414 and an elastic member 415. The positioning member 414, furnished to each end of the stator rack 411, is connected with the elastic member 415. The elastic member 415 is further connected with a side portion 411a of the stator rack 411. It shall be explained that the elastic member 415 can be a leaf spring. In another embodiment, the elastic member 415 can be a coil spring, a torsion spring or a cantilever beam.

In this embodiment, the positioning member 414 is furnished with at least one first positioning hole P1, and the base body 431 has at least one second positioning hole P2 in correspondence with the first positioning hole P1. In this embodiment, a locking element is used to penetrate both the first positioning hole P1 and the second positioning hole P2, such that the positioning member 414 of the stator 41 can be fixed to the base body 431. The elastic member 415 for maintaining a distance between the stator rack 411 and the corresponding mover rack 421 can suspend the stator racks 411 of the stator sets 41 above the mover rack 421. It shall be explained that, in FIG. 7 to FIG. 9, the embodiment with the positioning members 414 to be fastened on the base body 431 is only one of many aspects in accordance with this disclosure. In some other embodiments, various combinations already in the marketplace can be found to keep the stator rack 411 away from the respective mover rack 421 by a predetermined distance.

Upon aforesaid arrangement of this embodiment of the ultrasonic linear actuation device 4, the actuating component 413 generates oscillatory motions to stimulate orderly each of the stator sets 41 so as to generate corresponding standing-wave oscillations, so that the stator racks 411 of the first-set stator 41A, the second-set stator 41B and the third-set stator 41C would contact orderly the corresponding mover racks 421 of the mover 42. Thereupon, each of the stator racks 411 can mesh with the corresponding mover racks 421, such that the mover 42 can be driven to displace in the moving direction L2.

Furthermore, while the moving guide mechanism 43 moves upward, sideward movements of the mover 42 would be restrained by the sidewalls of the groove 431a of the base body 431, such that the mover 42 can only slide in the moving direction L2 (i.e., in the longitudinal direction of the base body 431). In addition, via the sliding member 433, the mover 42 of this embodiment would displace within the two stop members 432 of the constraint member 432. Namely, thereby the mover 42 can only travel in the moving direction L2.

In addition, in this embodiment, the actuating component 413 can be utilized to orderly stimulate the stator sets 41 to generate resonances and thus standing-wave oscillations, and further the intermittent motions of the stator sets 41 would be applied to displace the mover 42 in a specific direction. Referring to FIG. 10, the tooth profile of the stator tooth 412 is a symmetric tooth profile, the tooth profile of the mover tooth 422 is also a symmetric tooth profile, and thus the mover 4 can go left or right; i.e., bidirectional. In another embodiment, as shown in FIG. 4 or FIG. 6, different arrangements of the stator and the mover are provided.

Further, in this embodiment, the timing control upon the actuating component 413 for stimulation is applied to have the first-set stator 41A, the second-set stator 41B and the third-set stator 41C to generate corresponding standing-wave oscillations, such that the moving speed of the mover 42 can be effectively raised. In other words, in this embodiment, through controlling the switch frequency and standing-wave oscillations of the stator sets 41, the meshing efficiency between racks can be substantially enhanced to displace the mover 32.

In addition, this embodiment utilizes each of the stator sets 41 to generate corresponding standing-wave oscillations. When the excited oscillations approach any of resonant frequencies, the vibrations will grow rapidly, and so is the vibrational amplitudes of the stator 41. Thereby, the required displacement for the stator rack 411 to mesh the mover rack 421 would be obtained. Thereupon, the entire dimension (especially in thickness) of the ultrasonic linear actuation device 4 can be substantially reduced. In addition, as the amplitude of the vibration of the stators 41 is increased rapidly, the stator rack 411 would be much easier to mesh the mover rack 421. Also, since the meshing of gear racks is a type of stiff contact, thus wear of related components can be reduced.

In addition, the output force of this embodiment is mainly the supportive force provided from the engagement of the stator rack 411 and the mover rack 421. In other words, the reason that the output force of this embodiment can be increased is because the conventional friction forcing is replaced by the meshing of gear racks in this embodiment. Thus, the embodiment of the ultrasonic linear actuation device 4 of this disclosure can provide a satisfied output force, even that the size thereof is reduced.

In summary, in the ultrasonic linear actuation device provided by this disclosure, the actuating component is used to generate oscillatory motions for further exciting the respective stator sets to produce standing-wave oscillations, such that individual stator sets would engage with the corresponding mover racks. Thereupon, the mover can be moved purposely.

Further, this disclosure uses individual stator sets to generate corresponding standing-wave oscillations, and thus the related vibrational amplitudes can be increased. Thereby, the required displacement for the stator racks to mesh the mover rack can be obtained, and the entire thickness of the ultrasonic linear actuation device can be reduced.

In addition, the spacing between the neighboring stator sets can prevent the stator rack of the stator from hitting the mover-tooth top of the mover rack of the mover.

Further, the actuating component provided by this disclosure can be utilized to orderly stimulate the stator sets to generate resonances and thus standing-wave oscillations, and further the intermittent motions of the stator sets would be applied to displace the mover in a specific direction.

In addition, the conventional design utilizes friction to drive the mover, the maximum output force is limited by the magnitude of the friction, and thus wear in components would be obvious. On the other hand, this disclosure utilizes each of the stator sets to generate corresponding standing-wave oscillations. When the excited oscillations approach any of resonant frequencies, the vibrations will grow rapidly, and so the required displacement for the stator rack to mesh the mover rack would be obtained. Namely, as the amplitude of the vibration of the stators is increased rapidly, the stator rack would be much easier to mesh the mover rack. Also, since the meshing of gear racks is a type of stiff contact, thus wear of related components can be reduced.

In addition, the output force of this disclosure is mainly the supportive force provided from the engagement of the stator rack and the mover rack. In other words, the reason that the output force of this embodiment can be increased is because the conventional friction forcing is replaced by the meshing of gear racks in this disclosure. Thus, the ultrasonic linear actuation device of this disclosure can provide a satisfied output force, even that the size thereof is reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An ultrasonic linear actuation device, comprising:
a mover, including at least one mover rack; and
a plurality of stator sets, located in correspondence with the mover, each of the plurality of stator sets including an actuating component and a plurality of stator racks, the actuating component being used for stimulating corresponding one of the plurality of stator sets to generate standing-wave oscillations in an oscillation direction, such that the plurality of stator racks of each of the plurality of stator sets engage the at least one mover rack of the mover to allow the stator racks to mesh the corresponding mover rack and thus to displace the mover in a moving direction.

2. The ultrasonic linear actuation device of claim 1, wherein the plurality of stator sets are orderly arranged in the moving direction to have the plurality of stator racks of each of the plurality of stator sets to be positioned in correspondence with the at least one mover rack of the mover.

3. The ultrasonic linear actuation device of claim 2, wherein the actuating component generates oscillatory motions to stimulate the plurality of stator sets orderly to generate the standing-wave oscillations.

4. The ultrasonic linear actuation device of claim 1, further including an inter-stator spacing between two neighboring stator sets.

5. The ultrasonic linear actuation device of claim 4, wherein the the inter-stator spacing of is less than or equal to ½ of a mover-tooth base width of the at least one mover rack.

6. The ultrasonic linear actuation device of claim 5, wherein each of the plurality of stator racks has a plurality of stator teeth, and a tooth profile for the plurality of stator teeth is an asymmetric tooth profile.

7. The ultrasonic linear actuation device of claim 6, wherein the tooth profile is a right-angle tooth profile, a right-angle trapezoidal tooth profile, or an asymmetric tooth profile including at least two of aforesaid tooth profiles.

8. The ultrasonic linear actuation device of claim 1, wherein the plurality of stator sets includes three stator sets, and an inter-stator spacing among these three stator sets is less than or equal to ⅓ of a mover-tooth base width of the at least one mover rack.

9. The ultrasonic linear actuation device of claim 8, wherein each of the plurality of stator racks has a plurality of stator teeth, and a tooth profile for the plurality of stator teeth is a symmetric tooth profile.

10. The ultrasonic linear actuation device of claim 9, wherein the tooth profile is an isosceles triangular tooth profile, an isosceles trapezoidal tooth profile, an arc-shape tooth profile, or a symmetric tooth profile including at least two of aforesaid tooth profiles.

11. The ultrasonic linear actuation device of claim 1, wherein each of the plurality of stator racks includes at least one stator-tooth contact surface, and the at least one mover rack includes at least one mover-tooth contact surface; wherein when the corresponding stator set generates the standing-wave oscillations, the at least one stator-tooth contact surface approaches and finally contacts the corresponding mover-tooth contact surface.

12. The ultrasonic linear actuation device of claim 11, wherein the at least one mover rack includes a mover-tooth top, the mover-tooth top connects the at least one mover-tooth contact surface, and the moving direction of the mover is oblique to the at least one mover-tooth contact surface.

13. The ultrasonic linear actuation device of claim 1, wherein each of the plurality of stator racks has a plurality of stator teeth, a tooth profile for the plurality of stator teeth is a triangular tooth profile, a trapezoidal tooth profile, an arc-shape tooth profile, or a combination including at least two said tooth profiles.

14. The ultrasonic linear actuation device of claim 1, wherein the at least one mover rack has a plurality of mover teeth, a tooth profile for the plurality of mover teeth is a triangular tooth profile, a trapezoidal tooth profile, an arc-shape tooth profile, or a combination including at least two said tooth profiles.

15. The ultrasonic linear actuation device of claim 1, wherein the actuating component is one of a piezoelectric actuator, an electrostatic actuator and an electromagnetic actuator.

16. The ultrasonic linear actuation device of claim 1, wherein the oscillation direction is perpendicular to the moving direction.

17. The ultrasonic linear actuation device of claim 1, wherein each of the plurality of stator sets further includes an elastic member for maintaining a distance between each of the plurality of stator racks and the corresponding mover rack.

18. The ultrasonic linear actuation device of claim 17, further including a moving guide mechanism, the mover being to displace on the moving guide mechanism.

19. The ultrasonic linear actuation device of claim 18, wherein the moving guide mechanism includes a base body, the base body includes a groove, and the groove allows the mover only to displace in the moving direction.

20. The ultrasonic linear actuation device of claim 19, wherein each of the plurality of stator sets further includes a positioning member connected with the elastic member, the positioning member being fastened onto the base body.

21. The ultrasonic linear actuation device of claim 19, wherein the moving guide mechanism includes:
- a constraint member, located inside the groove of the base body; and
- a sliding member, movably disposed on the constraint member, the sliding member displacing between two stop members of the constraint member so as to have the mover to displace in the moving direction.

* * * * *